3,091,653
PROCESSES FOR PURIFYING CONJUGATED DIOLEFINS
Josef Nogradi, Cologne-Stammheim, Germany, assignor to Farbenfabriken Bayer Aktiengesellschaft, Leverkusen, Germany, a corporation of Germany
No Drawing. Filed Dec. 22, 1959, Ser. No. 861,222
Claims priority, application Germany Dec. 24, 1958
7 Claims. (Cl. 260—681.5)

The present invention relates to a process for purifying conjugated diolefins.

It is essential to employ extremely pure monomers when conjugated diolefins, such as butadiene, its homologues and derivatives, are polymerized in the presence of an alkali metal, alkali-metal organometallic compound or an organometallic complex catalyst. The presence in the monomers of impurities which react with the catalysts and render them ineffective, is particularly disturbing. Such impurities are usually present in very small amounts and include inter alia water, cyclopentadiene, acetylene, acetylene derivatives and compounds containing oxygen, nitrogen and sulphur such as aldehydes and alcohols.

It is known to purify monomeric conjugated diolefins by treating them with alkali metals, such as finely divided sodium, followed by distillation. An important disadvantage of this method of purification is that unavoidable and more or less extensive polymerization of the diolefin takes place resulting not only in losses of monomer, but the purifying operation is also made impracticable from a commercial point of view due to the polymer which collects in the apparatus.

It is an object of the present invention to provide a very effective and adequate purification process for conjugated diolefins, especially those of the butadiene series.

It is a further object of this invention to suppress largely the polymerization of conjugated diolefins during the purification thereof.

It is a further object of this invention to provide conjugated diolefins of such a degree of purity that a substantially shorter latent or induction period is observed in the polymerizaiton of the conjugated diolefin.

According to the present invention a purification of conjugated diolefins, especially those of the butadiene series, without the above mentioned disadvantages can be effected if the purification is carried out with alkali metals in the presence of organic halogenated hydrocarbons.

This discovery was particularly surprising, because it is known from German Patent No. 524,668 that diolefins can be polymerized with the aid of alkali metals in the presence of small quantities of organic halogen compounds, these quantities being below the equivalence value. The process according to the present invention on the other hand makes it possible almost completely to prevent the polymerization of the diolefins by using preferably approximately equivalent quantities of halogenated hydrocarbons.

The halogenated hydrocarbons or mixtures thereof employed in the process according to the present invention may be aliphatic, cycloaliphatic or araliphatic halogenated hydrocarbons containing one or more halogen atoms. These halogenated hydrocarbons contain halogen atoms in primary or secondary aliphatic bonding. Hydrocarbons containing aromatic bonded halogen are not effective. Further the halogenated hydrocarbons should be saturated, except that such hydrocarbons may contain substituent aromatic radicals. Those halogenated hydrocarbons are preferred in which the halogen atoms are connected to primary carbon atoms. The latter compounds in general are compounds which do not react or which react only slowly with alkali metals in the presence of diolefins. In principle, it is possible to use chlorides, bromides and iodides, although it is preferred to employ the chlorine compounds. Halogenated hydrocarbons of the aforementioned type suitable for employment in the process according to the present invention are aliphatic primary halogenated hydrocarbons such as, for example, ethyl iodide, n-butyl chloride, butyl bromide, primary isobutyl chloride, primary isobutyl bromide, n-hexyl bromide, n-hexyl chloride, n-octyl bromide, n-octyl chloride, dodecyl bromide, dodecyl chloride, n-octadecyl chloride, cycloaliphatic halogenated hydrocarbons such as cyclohexyl chloride, cyclohexyl bromide, 1-chloro-tetrahydronaphthalene, 1-chloro-decahydronaphthalene, araliphatic halogenated hydrocarbons such as benzyl chloride, benzyl bromide, β-chloro-ethyl-benzene or polyhalogen hydrocarbons such, for example, as 1,4-dichlorobutane, 1,1,2-trichloroethane, benzal chloride, and benzal bromide.

The choice of the actual halogen compound employed depends on the reactivity of the diolefin to be purified towards polymerization and also on the recovery process which is provided. Since the purified conjugated diolefin must be absolutely free from halogen compounds, which would have an unfavorable effect on the polymerization of the diolefin, it is essential that the halide should be carefully separated out. To facilitate separation of the halide from the purified diolefin, it is therefore preferred to employ relatively nonvolatile higher aliphatic chlorine compounds, such as dodecyl chloride and n-octadecyl chloride in the purification thereof. However, by suitable careful fractionation it is also possible to use low-boiling halides, such as butyl chloride, hexyl chloride, cyclohexyl chloride and benzyl chloride.

The halogenated hydrocarbons or mixtures thereof can be combined with any alkyl metal such as, for example, lithium, sodium, potassium, their alloys, i.e., any desired alloy of the alkali metal with one another or with alkaline earth metals, although sodium and lithium are preferred from an economic point of view. These alkali metals may be employed in finely divided form, i.e., a particle size of 1 mm. in diameter and less, advantageously from 20 to 100 microns, produced by stirring the metal in a suitable high-boiling solvent such as toluene, xylene, paraffin, petroleum, etc., above its melting point in usual manner. Preferably these finely divided alkali metals are employed in the form of a suspension in a high-boiling hydrocarbon, such as the aforementioned, or in the form of a paste with vaseline. In this way they can be easily handled and measured in a simple and relatively safe manner.

The process of the present invention may be employed in the purification of aliphatic conjugated diolefins, preferably those containing 4 to 8 carbon atoms, such as butadiene, 2 - methyl - butadiene, 2,3 - dimethylbutadiene, hexadiene-(1,3), hexadiene-(2,4) and the like.

The quantity of alkali metal usually employed in this purification process is from 0.1 to 5 parts by weight, based on one hundred parts by weight of the monomer to be purified.

The quantity of the halogenated hydrocarbon employed depends on the quantity of the alkali metal utilized. In practice it will generally be found to be satisfactory to employ the halogenated hydrocarbon and alkali metal in at least equivalent amounts, that is to say in amounts according to which at least one halogen atom is present per atom of alkali metal. It is preferred to use such amounts of halogenated hydrocarbons that one to two halogen atoms are present per atom of alkali metal, although also higher amounts may be applied in special cases. The quantity of halogenated hydrocarbon employed also depends on the activity of the halogenated hydrocarbon. For example, with halogenated hydrocarbons of high activity, such as aliphatic primary halogen-containing hydrocarbons, equivalent quantities are sufficient.

The temperature at which the purification of the conjugated diolefin is carried out and the time necessary for purification depend on the reactivity of the conjugated diolefin being purified. For example, with a very reactive diolefin, a low temperature and a relatively short reaction time is necessary. The purification process may be performed at room temperature or at an elevated temperature. In order to obviate polymerization of the conjugated diolefin, it is preferred to carry out the purification at a temperature above 0° C., not exceeding 80° C. In most cases, reaction times of from 4 to 24 hours and temperatures of from 35 to 60° C. are sufficient. However, a high-boiling diolefin, such as phenyl butadiene, may necessitate the employment of higher temperatures. It is true that higher temperatures accelerate the purification, but an upper temperature limit is nevertheless set by the thermal polymerization which takes place and the losses of monomer which are caused thereby, for instance, an upper temperature limit is given in purifying butadiene at about 90° C. or isoprene at about 100° C.

The purification of conjugated diolefins when using the aforementioned combinations may be carried out either continuously or intermittently. For example, the monomers may be heated with the previously described combinations of alkali metals and halogenated hydrocarbons in a conventional distillation apparatus equipped with a supplementary reflux condenser until the impurities have been rendered harmless. The sequence of adding the alkali metal and halogenated hydrocarbon to the conjugated diolefin to be purified is unimportant. They should not, however, be added simultaneously or mixed with one another. The halogenated hydrocarbons may be added to the conjugated diolefins undiluted or diluted with suitable inert solvents such as, for example, saturated aliphatic, cycloaliphatic or aromatic hydrocarbons such as pentane, hexane, heptane, isooctane, paraffin oil, hydrogenated diesel oil and the like, cyclohexane, methylcyclohexane, benzene, toluene, xylene and the like.

The course or progress of the purification may be controlled advantageously by gas-chromatography methods.

The separation of the monomer from the reaction mixture is generally effected by fractional distillation, the degree of fractionation depending on the volatility of the particular halide employed.

In a preferred embodiment of the present purification process, the air (especially oxygen) in the apparatus should as far as possible, be displaced by flushing with an inert gas, such as nitrogen, argon, krypton, xenon or inert gaseous hydrocarbon such as methane, ethane, ethylene and the like.

The diolefins purified by the process according to the present invention polymerize in some cases with an exceptionally short latent or induction period and require the use of smaller quantities of polymerization catalyst and yield polymers of higher molecular weight than diolefins which have not been so purified.

The extent of these improvements, however, depends largely on the duration and the temperature of the pre-treatment with alkali metals. In the case of the known process, a limit is soon set because of the polymerization which occurs. It is only the addition of the halogenated hydrocarbons which permits the time and the temperature of the pre-treatment to be so increased that advantages such as hitherto were not possible are obtained as regards the aforementioned properties.

In the following examples all parts are by weight.

*Example 1*

100 parts of normal commercial isoprene (95%), 0.5 part of finely divided sodium (particle size 20–100 microns) and 4.5 parts of dodecyl chloride are boiled under reflux in an argon atmosphere for 8 hours in a distillation apparatus. Thereafter, substantially all of the isoprene is distilled off and used for polymerization. 0.03 part of lithium butyl is sufficient for the polymerization of 100 parts of the isoprene thus purified, the polymerization being carried out in known manner. The polyisoprene thereby obtained at 25° C. has a limiting intrinsic viscosity $\eta=5.31$ (measured in chlorobenzene).

The distillation residue resulting from the purification of the isoprene is unchanged and still thinly liquid. After adding isopropyl alcohol to the distillation residue, no polymer precipitates; only a small quantity of finely divided salt remains undissolved in the alcohol.

By comparison therewith, 100 parts of isoprene was treated in a similar manner with 0.5 part of finely divided sodium without adding dodecyl chloride and at the reflux temperature of the isoprene. The purification was stopped after 4 hours due to commencement of polymerization of the isoprene. The isoprene was distilled off from the residue which gradually became a more viscous liquid. At least 0.1 part of lithium butyl was required to polymerize 100 parts of the isoprene thus purified. The polyisoprene thereby obtained at 25° C. had an intrinsic viscosity $\eta=2.15$ (measured in chlorobenzene).

Isopropyl alcohol was added to the viscous liquid distillation residue resulting from the purification of the isoprene to destroy the sodium. As a result, copious quantities of a soft rubber-like polymer precipitated. The polymer was washed with methanol and dried in vacuo at 50° C. It weighed 9.8 g.

*Example 2*

1000 grams of butadiene, containing impurities of oxygen, peroxides and $\alpha$-acetylenes, are contacted in a 6000 cc. steel autoclave with 10 grams of finely divided sodium and 39.6 grams of butyl chloride during 4 hours at a temperature of 35° C. After this time, butadiene is distilled off and fractionated by an effective column with external cooling. The butadiene purified in this manner shows a substantially shortened induction period in polymerization when compared with butadiene purified by known methods.

*Example 3*

100 parts of commercial isoprene (95%) are heated for 6 hours under reflux together with 1 part of finely divided (particle size<1 mm.) sodium (33% in vaseline) and 13 parts of cyclohexyl bromide. The isoprene obtained after distillation polymerizes extremely easily at low temperatures after adding an organometallic catalyst. The distillation residue contains no polymeric material.

*Example 4*

100 parts of commercial isoprene (95%) are contacted during 4 hours at 70° C. under pressure with 0.5 part of finely divided lithium and 8.8 parts of 1,4-dichlorobutane.

The isoprene which is obtained after distillation requires in polymerization smaller quantities of polymerization catalyst, for example, lithium butyl, and shows a substantially shorter induction period.

What is claimed is:

1. A process for the purification of a conjugated diolefin without the formation of substantial amounts of diolefin polymers which comprises contacting the conjugated diolefin at a temperature between about 0° and about 80° C., in the absence of oxygen, with an alkali metal in an amount between 0.1 and 5 parts by weight per hundred parts by weight of the conjugated diolefin, together with a halogen-substituted hydrocarbon of the group consisting of chlorine-substituted and bromine-substituted araliphatic hydrocarbons free from nonbenzenoid halogen substituents, and chlorine-substituted and bromine-substituted saturated aliphatic and cycloaliphatic hydrocarbons, in such an amount that the ratio of atoms of the halogen in the halogen-substituted hydrocarbon to atoms of the alkali metal is between 1:1 and 2:1, and subsequently recovering the purified conjugated diolefin.

2. A process as defined in claim 1 in which the alkali metal and halogenated hydrocarbon are contacted with the conjugated diolefin at a temperature between 35 and 60° C.

3. A process as defined in claim 1 in which the halogenated hydrocarbon is a saturated aliphatic chlorinated hydrocarbon in which the chlorine atom is connected to a primary carbon atom.

4. A process for the purification of isoprene which comprises heating approximately 100 parts by weight of isoprene at a temperature between 35 and 80° C. in contact with between 0.1 and 5 parts by weight of finely divided sodium and an amount of dodecyl chloride such that at least one atom of halogen of the dodecyl chloride is present for each atom of sodium, and thereafter distilling off the purified isoprene.

5. A process for the purification of butadiene which comprises heating approximately 100 parts by weight of butadiene at a temperature between 35 and 80° C. in contact with between 0.1 and 5 parts by weight of finely divided sodium and an amount of butyl chloride such that at least one atom of halogen of the butyl chloride is present for each atom of sodium, and thereafter distilling off the purified butadiene.

6. A process for the purification of isoprene which comprises heating approximately 100 parts by weight of isoprene at a temperature between 35 and 80° C. in contact with between 0.1 and 5 parts by weight of finely divided sodium and an amount of cyclohexyl bromide such that at least one atom of halogen of the cyclohexyl bromide is present for each atom of sodium, and thereafter distilling off the purified isoprene.

7. A process for the purification of isoprene which comprises heating approximately 100 parts by weight of isoprene at a temperature between 35 and 80° C. in contact with between 0.1 and 5 parts by weight of finely divided lithium and an amount of 1,4-dichlorobutane such that at least one atom of halogen of the 1,4-dichlorobutane is present for each atom of lithium, and thereafter distilling off the purified isoprene.

References Cited in the file of this patent

UNITED STATES PATENTS

| | | |
|---|---|---|
| 1,921,867 | Ebert et al. | Aug. 8, 1933 |
| 2,398,973 | Soday | Apr. 23, 1946 |
| 2,699,457 | Ziegler et al. | Jan. 11, 1955 |
| 2,797,208 | Burke | June 25, 1957 |
| 2,804,489 | Pines et al. | Aug. 27, 1957 |

FOREIGN PATENTS

| | | |
|---|---|---|
| 524,668 | Germany | May 11, 1931 |